United States Patent [19]
Uesugi

[11] Patent Number: 5,483,141
[45] Date of Patent: Jan. 9, 1996

[54] METHOD AND APPARATUS FOR CONTROLLING REFRIGERATOR CYCLE

[75] Inventor: Michika Uesugi, Fuji, Japan

[73] Assignee: Kabushiki Kaisha Toshiba, Kawasaki, Japan

[21] Appl. No.: 160,147

[22] Filed: Dec. 2, 1993

[30] Foreign Application Priority Data

Dec. 3, 1992 [JP] Japan .................. 4-323527

[51] Int. Cl.$^6$ .................. H02P 5/28
[52] U.S. Cl. .................. 318/811; 388/811; 318/599
[58] Field of Search .................. 388/811; 318/599, 318/254, 439, 138, 798–815; 417/243; 236/67

[56] References Cited

U.S. PATENT DOCUMENTS

| | | | |
|---|---|---|---|
| 4,584,636 | 4/1986 | Ando et al. | 318/811 |
| 5,017,855 | 5/1991 | Byers et al. | 318/811 |
| 5,210,684 | 5/1993 | Nam | 318/811 |
| 5,304,913 | 4/1994 | Anticole | 318/811 |

FOREIGN PATENT DOCUMENTS 60-54571  11/1985  Japan .

Primary Examiner—Jonathan Wysocki
Assistant Examiner—Karen Masih
Attorney, Agent, or Firm—Foley & Lardner

[57] ABSTRACT

In case an instantaneous over-current flowing through switching elements is detected between a predetermined rise time point and a predetermined fall time point of each of the PWM control pulses, the output of the duty control circuit is stopped immediately. In other words, the duty factor of the PWM pulse signal to be outputted as it is under the normal conditions is reduced so as to be cut off after the over-current has been detected. Therefore, it is possible to protect the switching elements of the inverter from breakdown due to over-current, without stopping the operation of the compressor and the compressor motor.

6 Claims, 3 Drawing Sheets

METHOD AND APPARATUS FOR CONTROLLING REFRIGERATOR CYCLE

BACKGROUND OF THE INVENTION

1. Field of the Invention

The present invention relates to a method and apparatus for controlling refrigeration cycle, by which revolution speed of a compressor can be controlled by an electronically commutated, brushless DC motor composed of a PWM-controlled inverter and a permanent magnet AC motor during refrigeration cycle to change the refrigeration capacity thereof.

2. Description of the Prior Art

In general, the speed of a compressor used in refrigeration cycle of an air conditioning apparatus or a refrigerating apparatus is controlled in accordance with pulse width modulation (PWM) control by use of an inverter.

In the inverter, a converter for converting AC power to DC power is provided on an input side of the inverter. The inverter and the converter are both composed of semiconductor switching elements. However, since the semiconductor switching elements are easily damaged by an over-current, the following protective method, for instance has been so far adopted: current flowing through a DC circuit is always detected; and when the detected current value increases to a limit value previously determined as a protective operating point, the output of the inverter is immediately interrupted to stop the compressor motor. In this control method, the operation delay time is lengthened with decreasing rise rate (di/dt) of the current, and shortened with increasing rise rate thereof.

In the above-mentioned conventional control method, however, the protective operation starts in response to a transient over-current to which the protective operation is not necessarily required, so that the compressor is often stopped. Once the compressor is stopped, it takes a relatively long time to restart the compressor.

In addition, when an over-current is generated at a high rise rate, the protective operation is often delayed, in spite of the fact that the protective operation is immediately required, thus resulting in a problem in that the semiconductor switching elements are often broken down.

SUMMARY OF THE INVENTION

Accordingly, the object of the present invention is to provide a method and apparatus for controlling a refrigeration cycle, by which the protective operation against over-current can be effected without stopping the compressor for protection of the semiconductor switching elements from breakdown due to over-current.

To achieve the above-mentioned object, the present invention provides a method of controlling a refrigeration cycle during which revolution speed of a compressor is controlled by an electronically commutated, brushless DC motor consisting of a PWM-controlled inverter and a permanent magnet AC motor to change a refrigeration capacity thereof, which comprises the steps of: detecting instantaneous current value flowing through switching elements of the inverter; and when the detected instantaneous current value reaches a predetermined level between a designated rise time point and a designated fall time point of each of pulses determined in accordance with PWM control, setting a command value of the PWM control pulse to zero beginning from when the detected current value reaches the predetermined level to the designated fall time point.

Further, the present invention provides a refrigeration cycle control apparatus, having: an electronically commutated, brushless DC motor for driving a compressor in a refrigeration cycle, said brushless DC motor consisting of a PWM-controlled inverter and a permanent magnet AC motor; a current detecting circuit for detecting instantaneous value of current flowing through switching elements of said inverter; and a PWM control circuit for PWM controlling said inverter, characterized in that said PWM control circuit comprises: a duty control circuit for outputting each of PWM control pulse signals between a predetermined pulse rise time point and a predetermined pulse fall time point so as to provide a predetermined duty factor to each PWM control pulse signal; and a duty limit circuit for allowing said duty control circuit to output a zero-level PWM control pulse signal, beginning from when the detected value of said current detecting circuit reaches a predetermined level to the predetermined pulse fall time point, whenever the detected value of said current detecting circuit reaches the predetermined level between the predetermined pulse rise time point and the predetermined pulse fall time point.

In the control method according to the present invention, under the normal operation, the duty control circuit outputs each of the PWM control command pulses between a predetermined pulse rise time point and a predetermined pulse fall time point so as to provide a predetermined duty factor in accordance with the PWM control method. However, in case an instantaneous over-current flowing through switching elements is detected between the predetermined rise time point and the predetermined fall time point of each of the PWM control pulses, the duty limit circuit immediately stops the output of the duty control circuit. In other words, the duty factor of the PWM pulse signal to be outputted as it is under the normal conditions is reduced so as to be cut off after the over-current has been detected. Therefore, it is possible to limit the current flowing through the semiconductor switching elements of the inverter below the limit value thereof, and thereby to protect the semiconductor switching elements from breakdown due to over-current, without stopping the operation of the compressor.

In the control method according to the present invention, since the compressor is not stopped for protective operation, it is unnecessary to adjust the operation delay time according to the rise rate of the current, so that the operation delay time can be set to a constant delay time. As a result, it is possible to securely prevent the semiconductor switching elements from being broken down due to an excessive delay of the start of the protective operation.

As described above, in the control method and apparatus of the present invention, whenever an over-current is detected, since the PWM control pulse signal is outputted by limiting the duty factor thereof within a predetermined range, it is possible to realize the protective operation for prevention of the semiconductor switching elements from breakdown, without stopping the compressor.

DETAILED DESCRIPTION OF THE PREFERRED EMBODIMENTS

Figure 1:
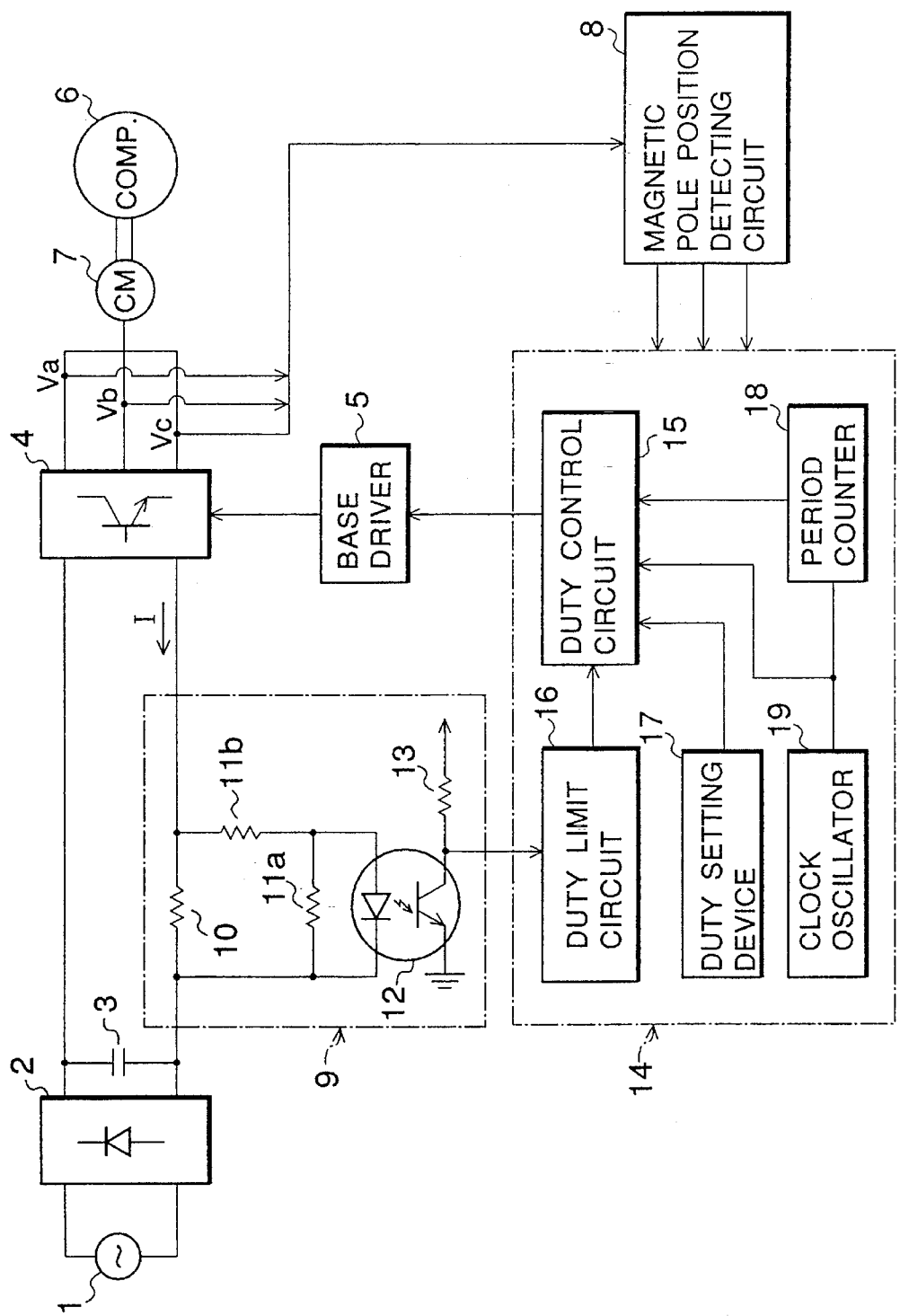
FIG. 1 is a block diagram showing one embodiment of the control apparatus according to the present invention.

An embodiment of the control apparatus according to the present invention will be described hereinbelow with reference to FIGS. 1 to 3. FIG. 1 is a block diagram showing the embodiment thereof. In FIG. 1, AC power supplied by an AC power source 1 is converted into DC power by a converter 2 composed of a plurality of diodes. The converted DC power is smoothed by a capacitor 3, and then supplied to an inverter 4 composed of a plurality of switching transistors. To the inverter 4, base currents are supplied from a base driver 5 for implementing PWM (pulse width modulation) control. A compressor motor 7 directly connected to a compressor 6 is driven on the basis of an AC output derived by the inverter 4. A permanent-magnet synchronous motor is used for the compressor motor 7. The respective magnetic pole positions of the synchronous motor 7 are detected by a magnetic pole position detecting circuit 8. On the basis of the detected magnetic pole position signals, the base currents of the inverter 4 are determined. Here, the inverter 4 serves as a commutator for the compressor motor 7, because the inverter 4 can be controllably turned on or off in response to the magnetic pole position signals. In other words, it is possible to regard that a brushless DC motor is constructed by the inverter 4 and the compressor motor 7.

In this embodiment, the magnetic pole position detecting circuit 8 detects the magnetic pole positions of the rotor of the compressor motor 7 on the basis of terminal voltages $V_a$, $V_b$ and $V_c$ of the compressor motor 7. The method of detecting the magnetic pole positions of the motor is disclosed in detail in U.S. Pat. No. 4,56, 286, which is incorporated herein by reference.

A current I flowing between the converter 2 and the inverter 4 is detected by a current detecting circuit 9. The current detecting circuit 9 includes a shunt resistance 10 interconnected in the DC current circuit, voltage dividing resistances 11a and 11b for dividing voltage across the shunt resistance 10, a photo-coupler 12 connected in parallel to the voltage dividing resistance 11a, and a pull-up resistance 13. The photo-coupler 12 is composed of a light emitting diode and a phototransistor. The pull-up resistance 13 is connected in series with the collector of the phototransistor.

A PWM control circuit 14 generates PWM control pulse signals on the basis of the detection signals of the magnetic pole position detecting circuit 8 and the current detecting circuit 9, and supplies the generated control pulse signals to the base driver 5. The PWM control circuit 14 includes a duty control circuit 15 having a duty counter, a duty limit circuit 16 functioning as a reset circuit, a duty setting device 17, a period counter 18, and a clock oscillator 19.

The operation of the control apparatus shown in FIG. 1 will be described hereinbelow. The duty control circuit (duty counter) 15 and the period counter 18 are both of down counter. Whenever the period counter 18 is reset to zero, the duty factor data and the period data are both replaced with new data. Here, the duty factor data are count data given from the duty setting device 17 to the duty control circuit 15 according to the duty factor whenever the data are replaced with new data. When this count data is 1 or more, the PWM control pulse signals are transmitted from the duty control circuit 15 to the base driver 5 as the duty factor data corresponding to the count data.

That is, under the normal operating conditions, the pulse rise and fall time points of each of the PWM pulse control signals outputted by the duty control circuit 15 are both determined on the basis of signals applied by the duty setting device 17, the period counter 18 and the clock oscillator 19. Only during the time interval between the rise and fall time points of one control pulse signal, a turn-on signal is applied to one of the transistors of the inverter 4.

The duty limit circuit 16 receives a detection signal of the current I from the current detecting circuit 9. In case the current I increases abruptly as when the compressor 6 is locked, for instance, at a time point when the current I reaches a predetermined limit level $I_L$, the duty limit circuit 16 transmits a limit signal (i.e., reset signal) to the duty control circuit 15. This limit level $I_L$ is set to be higher than the continuous rated value of the switching elements (transistors) constituting the inverter but lower than the instantaneous rated value thereof. In response to the reset signal, the duty control circuit 15 stops outputting the present PWM control pulse signal immediately, even if the PWM control pulse signals are being outputted, that is, before the time point at which the PWM control pulse signal falls under the normal operating conditions. Consequently, the duty factor of the PWM control pulse signal is reduced and thereby the turn-on duration of the output signal of the base driver 5 is shortened, as compared with the normal operating conditions.

As long as the detection signal of the current I is above the limit level $I_L$, the duty limit circuit 16 continues outputting the reset signal for each period, so that the duty factor of the subsequent PWM control pulse signal is also limited by this reset signal. Accordingly, it is possible to suppress the current flowing through the inverter 4 below a safe operating point value, with the result that it is possible to protect the switching transistors of the inverter 4 and the diodes of the converter 2 from over-current without stopping the operation of the compressor motor 7 and thereby the compressor 6.

In the conventional apparatus, once the compressor 6 is stopped, since it takes a relatively long time to restart the compressor 6, the delay time of the protective operation is adjusted according to the rise rate of the detected current in order to avoid the unnecessary protective operation as much as possible. Consequently, the protective operation tends to be delayed, thus causing a problem in that the switching elements such as transistors may be broken down. In the above-mentioned control apparatus according to the present invention, however, since the compressor 6 is not stopped, it is unnecessary to avoid the protective operation so much, with the result that the delay time of the protective operation can be set to a relatively short constant value. For instance, when the delay time of the protective operation is set on the basis of the higher rise rate of the detected current, since the protective operation is not delayed, it is possible to securely protect the switching elements such as transistors from breakdown.

Figure 2B:
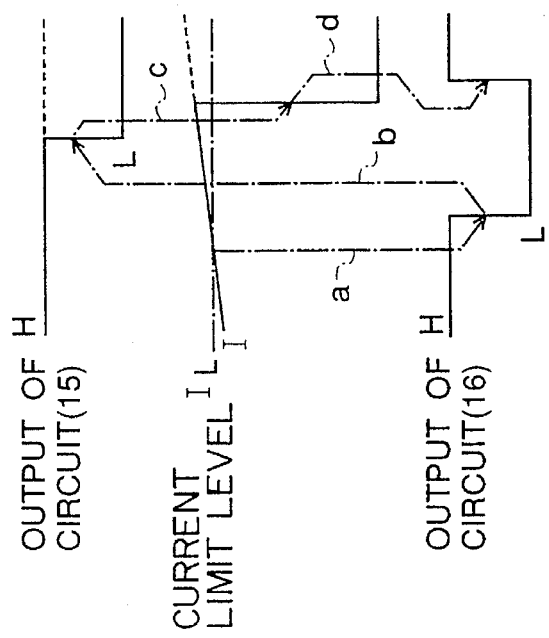
FIGS. 2A and B are timing charts for assistance in explaining the operation of the control apparatus shown in FIG. 1.
Figure 2A:
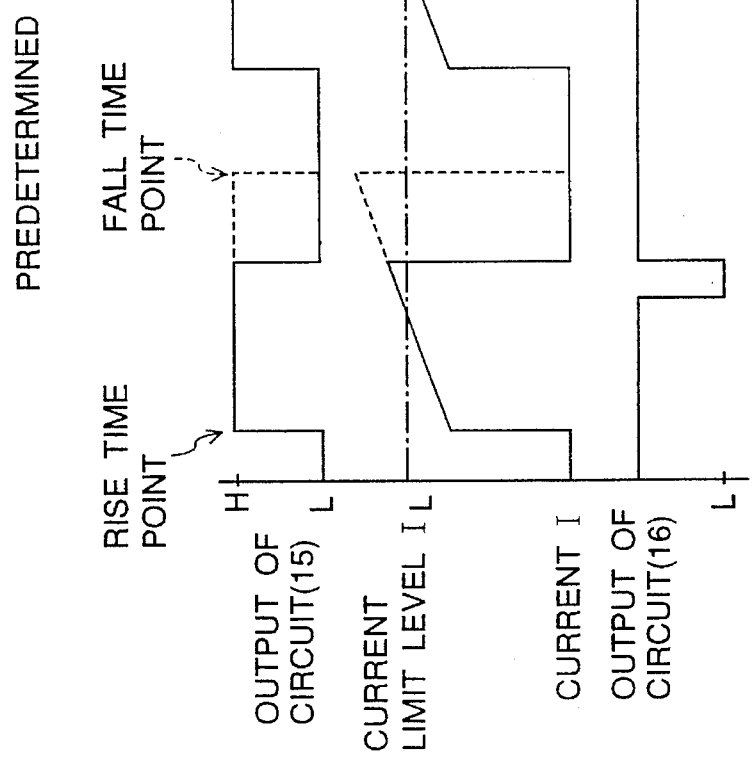

FIG. 2A is a timing chart of the signals obtained when the above-mentioned control operation is effected, in which the output (PWM control pulse) signal of the duty control circuit 15, the detection signal of the current I, and the output signal of the duty limit circuit 16 are shown. Further, FIG. 2B is another partial waveform diagram for assistance in explaining the corresponding relationship between the respective signals.

As shown in FIG. 2B, when the current I reaches the limit level $I_l$, the output signal of the duty limit circuit 16 changes from an H level to an L (reset) level, as shown by a dot-dashed arrow a. In response to this L level signal, the duty control circuit 15 immediately changes the output signal level thereof, that is, the PWM control pulse signal level changes from the H level to the L level, as shown by another dot-dashed arrow b, so that the current I is reduced to zero, as shown by another dot-dashed arrow c. Further, the reset signal of the duty limit circuit 16 is released and therefore the reset signal level is returned to the H level, as shown by the other dot-dashed arrow d.

In accordance with the operation as explained above, as shown in FIG. 2A, over-current portions (shown by dashed lines) are cut off or eliminated in the waveforms of the outputted PWM control pulse signal of the duty control circuit 15 and the detected current I. Accordingly, the instantaneous current flowing through the inverter 4 and the converter 2 can be reduced below the limit level, in order to protect the semiconductor elements of these circuits from current breakdown.

Figure 3:
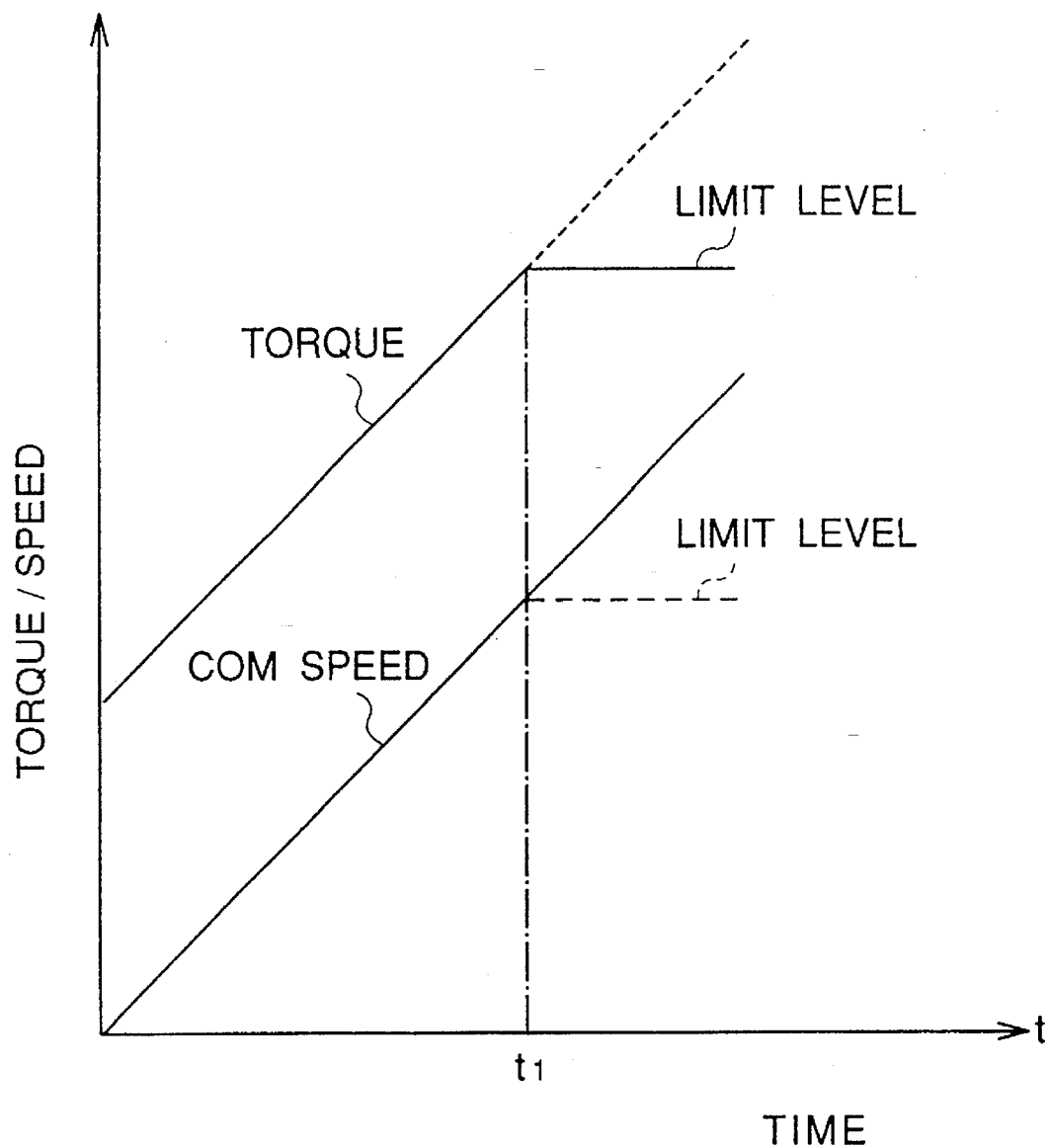
FIG. 3 is a graphical representation showing the characteristics of the compressor motor obtained by the control apparatus shown in FIG. 1.

FIG. 3 shows the characteristics of the command revolution speed and the load torque of the compressor 7 with respect to time, under the above-mentioned control. As depicted in FIG. 3, after the protective operation of the present invention has been started at time $t_1$, the compressor motor 7 is operated under the condition that the load torque is limited at a predetermined level in correspondence to the current I, irrespective of the command revolution speed of the motor 7, without stopping the operation of the motor 7.

What is claimed is:

1. A method of controlling a refrigeration cycle during which revolution speed of a compressor is controlled by an electronically commutated, brushless DC motor composed of a PWM-controlled inverter and a permanent-magnet AC motor to change a refrigeration capacity thereof, which comprises the steps of:

detecting instantaneous current value flowing through switching elements of the inverter; and when the detected instantaneous current value reaches a predetermined level at a point in time between a designated rise time point and a designated fall time point of a PWM control pulse, setting a command value of the PWM control pulse to zero.

2. The method of controlling a refrigeration cycle as set forth in claim 1, wherein the predetermined level is set higher than a continuous rated value of the switching elements but lower than an instantaneous rated value thereof.

3. A refrigeration cycle control apparatus, having:

an electronically commutated, brushless DC motor for driving a compressor in a refrigeration cycle, said brushless DC motor being composed of a PWM-controlled inverter and a permanent-magnet AC motor;

a current detecting circuit for detecting instantaneous value of current flowing through switching elements of said inverter; and a PWM control circuit for PWM controlling said inverter, wherein said PWM control circuit comprises:

a duty control circuit for outputting each of PWM control pulse signals between a predetermined pulse rise time point and a predetermined pulse fall time point so as to provide a predetermined duty factor to each PWM control pulse signal; and a duty limit circuit for allowing said duty control circuit to output a zero-level PWM control pulse signal whenever the detected value of said current detecting circuit reaches the predetermined level between the predetermined pulse rise time point and the predetermined pulse fall time point.

4. A refrigeration cycle control apparatus, comprising:

an electronically commutated, brushless DC motor for driving a compressor in a refrigeration cycle, said brushless DC motor including a PWM-controlled inverter and a permanent-magnet AC motor;

a current detecting circuit for detecting an instantaneous value of current flowing through switching elements of said inverter; and a PWM control circuit for PWM controlling said inverter, wherein said PWM control circuit includes a duty control circuit for outputting each of PWM control pulse signals between a predetermined pulse rise time point and a predetermined pulse fall time point so as to provide a predetermined duty factor to each PWM control pulse signal, and a duty limit circuit for allowing said duty control circuit to output a zero-level PWM control pulse signal whenever the detected value of said current detecting circuit reaches the predetermined level between the predetermined pulse rise time point and the predetermined pulse fall time point, and wherein said duty control circuit comprises a counter for outputting the PWM control pulse signals whenever a counter value reaches a count value determined to be corresponding to a pulse period.

5. The refrigeration cycle control apparatus as set forth in claim 4, wherein said PWM control circuit further comprises a period counter and a clock oscillator, said period counter counting clock signals outputted by said clock oscillator and transmitting a period signal to said duty control circuit whenever the count value reaches the determined count value.

6. The refrigeration cycle control apparatus as set forth in claim 5, wherein said PWM control circuit further comprises a duty setting device for setting a full count value corresponding to the duty factor to said duty control circuit.

* * * * *